Jan. 1, 1952

M. E. LEHMAN 2,581,263

MACHINE FOR DISTRIBUTING FERTILIZER
MATERIAL AND THE LIKE

Filed Sept. 26, 1947

6 Sheets-Sheet 1

FIG. 1.

INVENTOR
MAURICE E. LEHMAN

ATTORNEYS

Jan. 1, 1952
M. E. LEHMAN
2,581,263
MACHINE FOR DISTRIBUTING FERTILIZER
MATERIAL AND THE LIKE
Filed Sept. 26, 1947
6 Sheets-Sheet 2
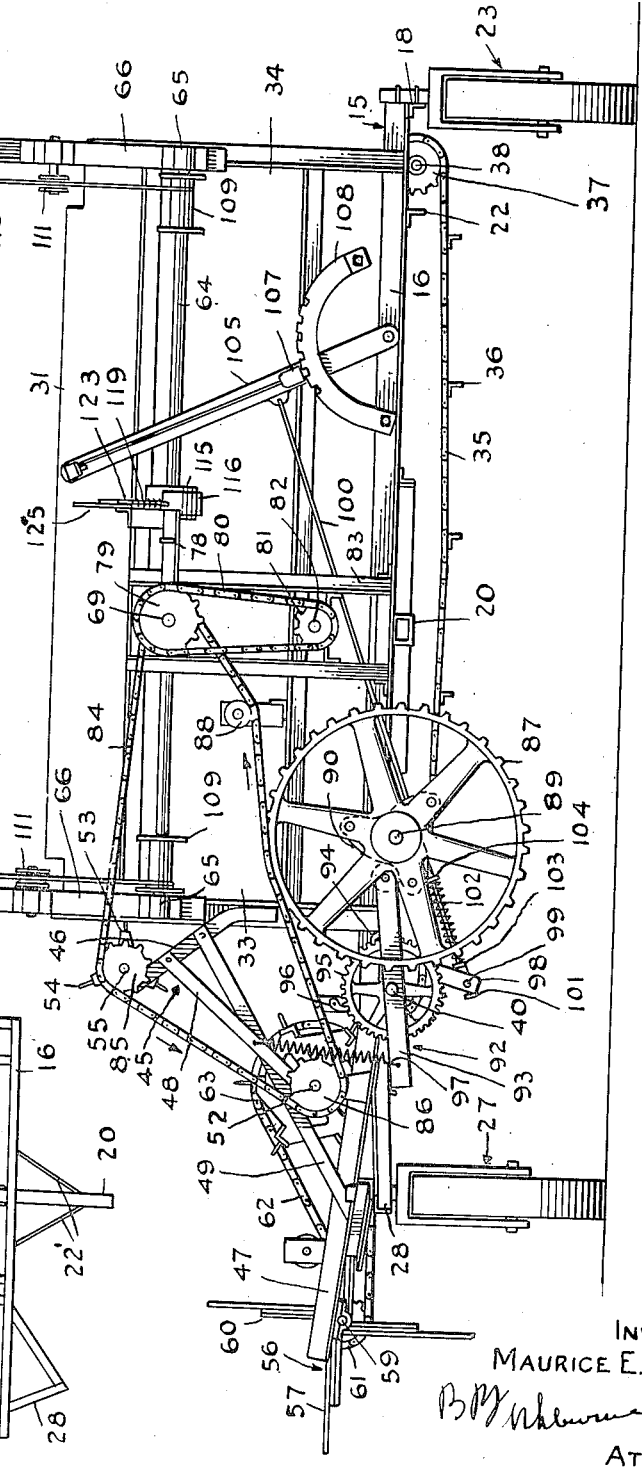
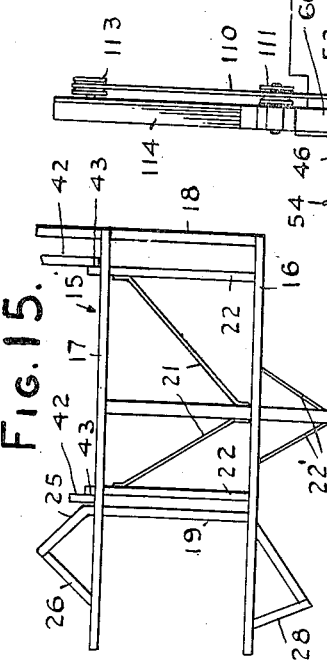
INVENTOR
MAURICE E. LEHMAN
ATTORNEYS

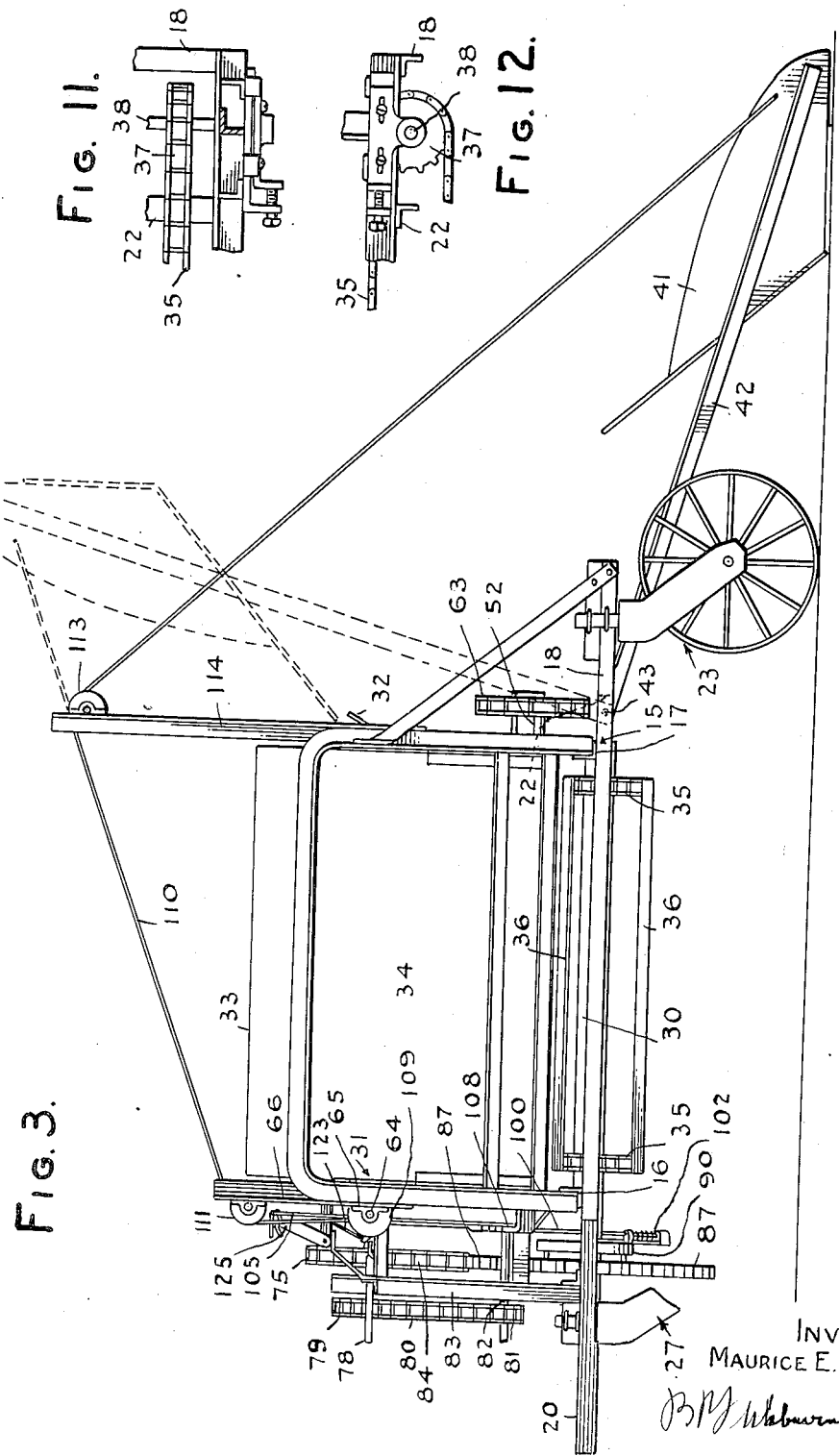

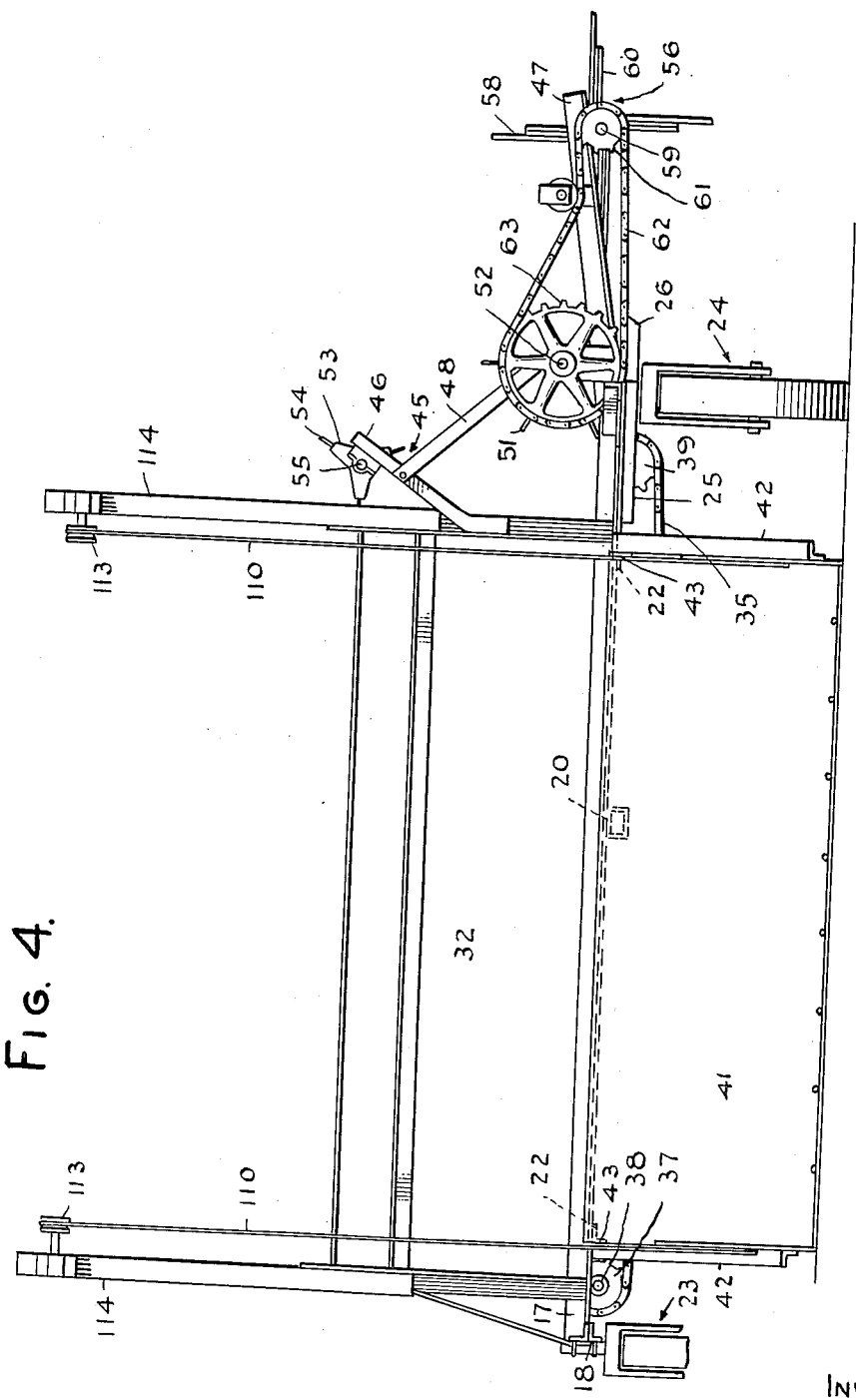

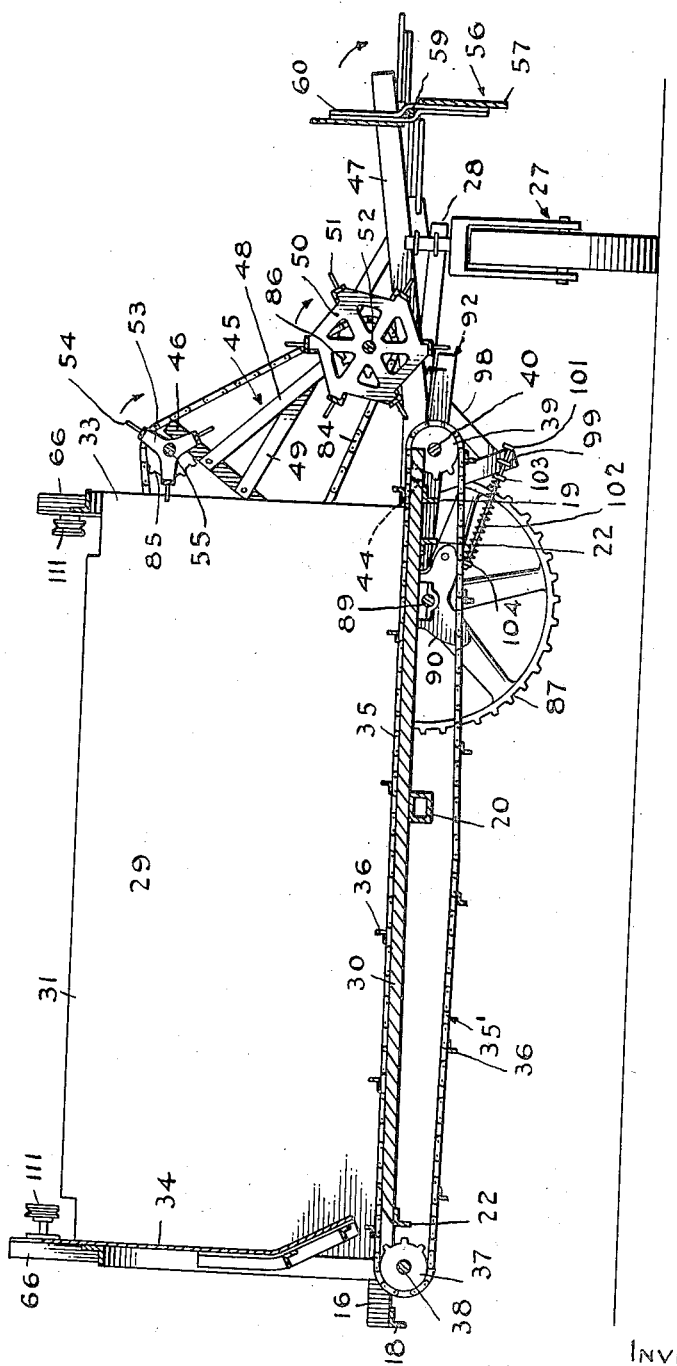

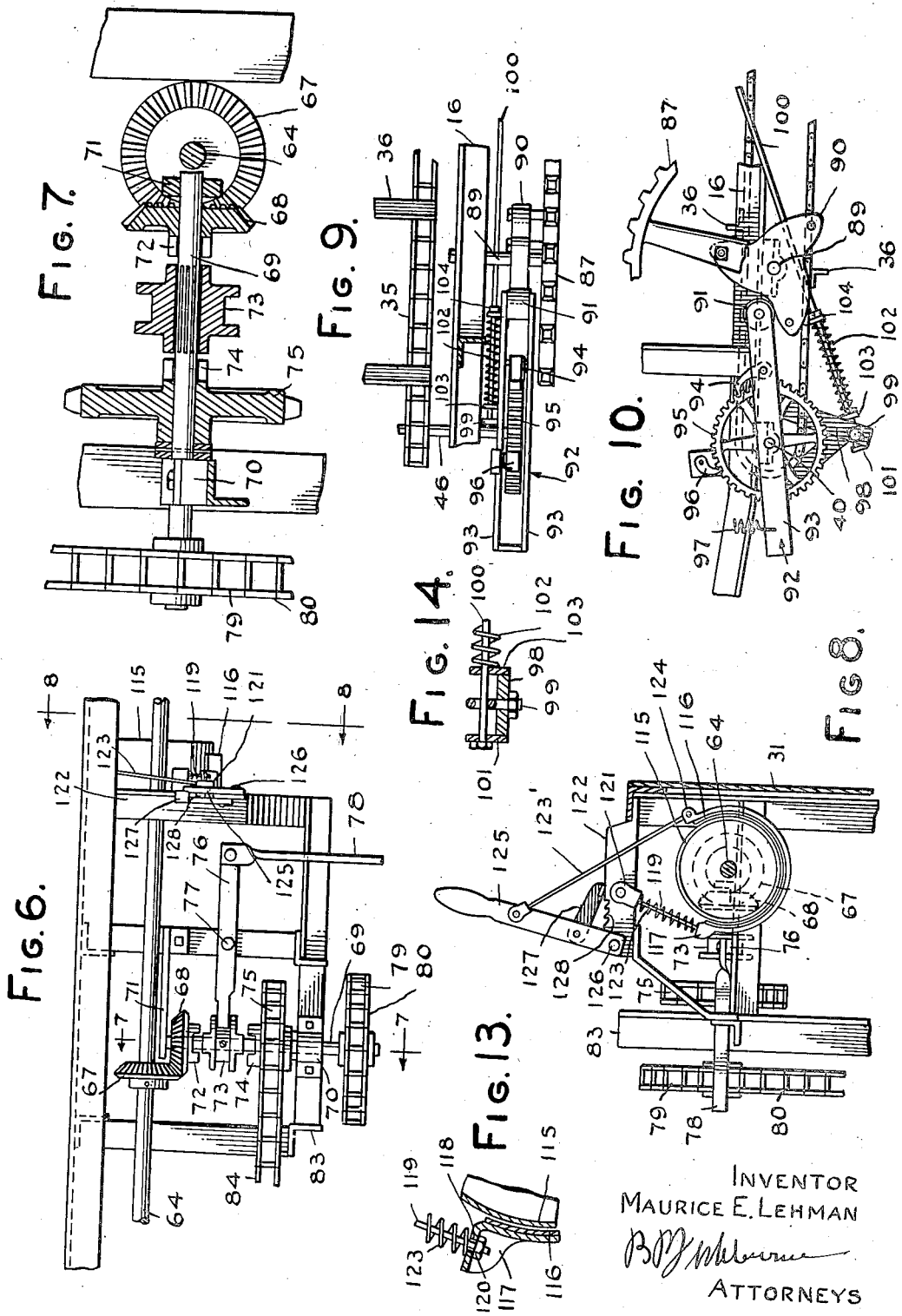

Patented Jan. 1, 1952

2,581,263

UNITED STATES PATENT OFFICE 2,581,263

MACHINE FOR DISTRIBUTING FERTILIZER MATERIAL AND THE LIKE

Maurice E. Lehman, Harrisonburg, Va.

Application September 26, 1947, Serial No. 776,334

4 Claims. (Cl. 275—6)

My invention relates to agricultural machinery and has particular reference to a machine for distributing or spreading manure, chemical fertilizer, lime, or the like.

An important object of the invention is to provide a machine of the above mentioned character which is particularly well adapted for handling manure, for dividing the same and distributing the divided product.

A further object of the invention is to provide a machine of the above mentioned character which discharges fertilizer at its side with respect to its direction of travel.

A further object of the invention is to provide a machine of the above mentioned character having loading means arranged at its rear end, with respect to its direction of travel.

A further object of the invention is to provide a machine of the above mentioned character which is designed to be connected with a tractor, to be moved longitudinally by the tractor and have its operating parts driven from the power take-off of the tractor.

Another object of the invention is to provide means whereby the distributing mechanism and the loading means may be connected with and disconnected from the source of power.

A further object of the invention is to provide caster wheels for supporting the frame of the machine so that the frame of the machine may be rigidly attached to the chassis of the tractor and will retain a fixed relation with respect to the same.

A further object of the invention is to provide long and short distributor paddles, whereby the fertilizer will be distributed over a wide strip in a uniform manner.

A further object of the invention is to provide means for effecting a step by step movement of the main feed belt, which means is power driven from the tractor.

Other objects and advantages of the invention will be apparent during the course of the following description.

In the accompanying drawings forming a part of this application, and in which like numerals are employed to designate like parts throughout same, Figure 1 is a plan view of a machine embodying my invention, Figure 2 is a front end elevation looking to the rear, Figure 3 is a side elevation of the machine, viewed from the side remote from the distributing mechanism, Figure 4 is a rear end elevation of the machine, Figure 5 is a transverse vertical section taken on line 5—5 of Figure 1, looking in the direction of the arrows, Figure 6 is an enlarged plan view of gearing, Figure 7 is a vertical section taken on line 7—7 of Figure 6, Figure 8 is a transverse section taken on line 8—8 of Figure 6, showing the brake mechanism, Figure 9 is a plan view of pawl and ratchet mechanism, and associated elements, Figure 10 is a side elevation of same, Figure 11 is a plan view of an adjustable bearing for the main endless belt, Figure 12 is a side elevation of same, parts broken away, Figure 13 is a detailed section through the brake band of Figure 16, Figure 14 is a detailed section through the lever 98 of Figure 10, and Figure 15 is a plan view of the main frame.

My machine embodies a main horizontal frame 15, Figures 1 and 15, including forward and rear transverse end bars 16 and 17, and side bars 18 and 19, which are of course rigidly connected. The numeral 20 designates a draw bar rigidly attached to the bars 16 and 17 and secured to diagonals 21, the rear ends of which are secured to inner longitudinal bars 22. These bars 22 are rigidly secured to the transverse bars 16 and 17. The draw bar 20 projects beyond the frame 15 for connection with the draw bar of the tractor. The frame 15 may also be provided with diagonal braces 22' secured to the bar 16 and attached to the draw bar 20. The draw bar 20 is rigidly attached to the frame of the tractor, with or without additional braces, whereby these two frames retain relative fixed positions during travel.

At the rear of the frame 15 is a caster wheel 23, having a swiveled connection with the bar 18. A caster wheel 24 also is arranged at the rear of the frame 15 near its opposite side, and this caster wheel has a swiveled connection with an angular extension 25 formed upon the bar 19. The angular extension 25 is connected with a brace 26, attached to the end portion of the transverse bar 17. The transverse bars 16 and 17 extend outwardly beyond the longitudinal bars 22, as shown. The numeral 27 designates a caster arranged forwardly of and near the frame 15, adjacent to the right end of the bar 16. This caster wheel has a swiveled connection with a bracket 28, rigidly secured to the bar 16, as shown.

These several caster wheels serve to support the frame 15, during its travel, to permit the frame to follow the frame of the tractor and retain a fixed relation thereto.

The frame 15 carries a box or body 29, rigidly mounted thereon, including a bottom 30, a front end 31, and a rear end 32. The top of this rear end 32 is flared rearwardly, Figure 3. The box further comprises a right open side or opening 33 and a left side 34. The numeral 35' designates an endless belt, including a pair of sprocket chains 35, connected by transverse angle irons 36, having webs which project upwardly above the bottom 30. The top run of the endless belt travels above the bottom 30, as shown. The sprocket chains 35 engage sprocket wheels 37, Figures 2 and 5, rigidly mounted upon a transverse shaft 38, journaled in suitable bearings carried by the frame 15. The sprocket chains 35 also engage sprocket wheels 39, rigidly mounted upon a shaft 40, mounted in suitable bearings carried by the frame 15. The endless belt serves to intermittently feed the material to the beater and distributor mechanism, as will be explained. Particular attention is called to the fact that the endless belt travels transversely of the direction of travel of the entire machine.

Arranged at the rear of the transverse bar 17, Figures 1, 3, and 15, is a scoop 41, of any well-known or preferred type, and this scoop is carried by vertically swinging arms 42, rigidly secured thereto, and these arms are hinged at 43, to the transverse bars 22, whereby the scoop may be swung in a vertical plane. When the scoop is in the lowermost position, its bottom will rest upon the ground, and when the machine is backed the scoop will be forced into the manure pile or the like, and filled. The scoop is then swung to a raised position, as indicated in dotted lines in Figure 3, and will dump the manure into the box 29.

The end 34 of the box, Figure 5, is closed except for an opening at its bottom for the passage of the endless conveyor. The opposite end 33 of the box is entirely open and the endless conveyor extends outwardly beyond for a short distance, as shown. The bottom 30 has openings 44 for receiving the sprocket wheels 39. A supporting framework 45 is provided adjacent to the open side 33 and is rigidly mounted upon the box 29 and the outer ends of the bars 16 and 17. This framework includes upper inclined bars 46, lower generally horizontal bars 47, and diagonals 48 and 49. A lower rotary beater 50 is provided, including radial pins 51. This rotary beater is mounted upon a shaft 52, journaled in suitable bearings carried by the diagonals 48. The pins 51 of the beater 50 travel close to sprocket wheels 39 and the discharge end of the endless belt 35', so that there is little tendency for the manure, before being divided or beaten, to drop from the endless belt before being taken up by the beater. The beater 50 rotates clockwise, Figure 5, and the manure is taken up by it and passes over this beater and is then thrown from the outer side of the beater. Arranged near the top of the open side 33 is an upper rotary beater 53, Figures 1, 2, and 5, having radial pins 54. This beater 53 is mounted upon a shaft 55, journaled in bearings carried by the inclined bars 46. Beater 53 turns clockwise, Figure 5. When the level of the manure within the box 29 rises sufficiently, the manure is brought into contact with the upper beater 53, and some of the manure is taken up by this upper beater and travels over the same and is thrown out from the upper beater upon the lower beater, where it is subjected to a second dividing or beating action, to be thrown outwardly by the lower beater. The beaters 50 and 53 serve to separate or divide the manure, which ordinarily is held together in mats or lumps, to a considerable extent. The numeral 56 designates a rotary distributor, including paddles or blades 57 and 58. These paddles are flat and are not spiral. The blades 57 are longer than the blades 58. The blades 57 and 58 are rigidly mounted upon a rotary shaft 59, journaled in suitable bearings secured to the bars 47. The blades form a plurality of distributing elements, and the blades in each distributing element are spaced 90 degrees, although this arrangement may be varied. A strap 60 is secured to each blade and is rigidly attached to the shaft 59. This strap is bent so that the blades are offset with respect to the shaft. This enables the blades to have an increased action to throw the manure generally horizontally and outwardly, and reduces the tendency to throw the manure upwardly. The distributor 56 is rotating clockwise in Figure 5, but is rotated faster than the beater 50. The beater 50 throws the divided manure upon the distributor 56, and this distributor throws the same upon the ground. Since the blades 57 are longer than the blades 58, they will throw the manure a greater distance, whereby the outer portion of the distributed manure upon the ground will be thicker than the inner portion next to the machine. The shorter blades 58 do not throw the manure as far as the long blades and distribute the same upon the near portion next to the machine. The long and short blades co-act to produce a continuous strip of distributed manure which is substantially uniform in thickness throughout its width. As the machine travels longitudinally, this strip of distributed manure is produced extending longitudinally of the travel of the machine and parallel therewith.

The shaft 59 has a small sprocket wheel 61, Figure 4, rigidly mounted thereon, engaged by a sprocket chain 62, engaging a large sprocket wheel 63, mounted upon the shaft 52. The rotary distributor 56 thereby receives its rotation from the beater 50 and rotates in the same direction, but at a higher speed.

Arranged outwardly of and near the front end 31 is a horizontal transverse shaft 64, journaled in bearings 65, Figures 1 and 2, secured to posts 66. As more clearly shown in Figures 1, 2, 3, and 7, the shaft 64 has a bevel gear 67, rigidly mounted thereon. This bevel gear 67 is in permanent mesh with a bevel gear 68. This bevel gear 68 is rotatable upon a stub-shaft 69, journaled in bearings 70 and 71, but cannot move longitudinally upon this stub-shaft. The bevel gear 68 has a clutch element 72 for co-action with the clutch element formed upon one end of a clutch head 73, mounted upon the shaft 69, to move longitudinally thereof and to turn therewith. The opposite end of the clutch head 73 has a clutch element for co-action with the clutch element 74 formed upon a sprocket wheel 75, rotatable upon the stub-shaft 69, but not moveable longitudinally thereof. The clutch head 73 is shifted in either direction by a lever 76, pivoted at 77. The lever 76 is swung by a link 78 and any suitable means may be employed to hold the link in the adjusted position. It is thus seen that the clutch head, when in the central position, will disengage both clutch elements, but the clutch head may be shifted in opposite directions to alternately lock the bevel gear 68 and the sprocket wheel 75 upon the shaft 69, for rotation therewith. A sprocket wheel 79 is rigidly mounted upon the outer end of the stub-shaft 69, and engages a downwardly extending sprocket chain 80, engaging a sprocket wheel 81, Figure 2. The sprocket wheel 81 is rigidly mounted upon a shaft 82, and this shaft is suitably mounted upon vertical uprights 83. The shaft 82 is connected with the power take-off shaft of the tractor. The sprocket wheel 75 is engaged by the sprocket chain 84, see more particularly Figure 2. The upper run of this sprocket chain passes over a sprocket wheel 85, rigidly mounted upon the shaft 55 of the upper beater. This upper run also passes about a sprocket wheel 86, rigidly mounted upon the shaft 52, of the lower beater 50. This sprocket chain then passes about a large sprocket wheel 87, Figure 2, and an idler or tightener 88, and returns to the sprocket wheel 75. It is thus seen that the sprocket wheel 75, through the medium of its sprocket chain, drives the upper and lower beaters in the same direction.

The large sprocket wheel 87 is carried by a horizontal shaft 89 suitably mounted upon the frame 15. Mounted upon the inner side of the sprocket wheel 87 is a 3-point cam 90, rotating therewith. This cam is arranged to engage with a roller 91 carried by a lever 92, including sides 93. This lever is pivoted upon the shaft 40, to swing vertically. The lever has a dog 94 pivoted thereto and engaging a gear wheel 95, rigidly mounted upon the shaft 49. Back turning movement of the gear 95 is prevented by a dog 96, as shown. The lever has its end remote from the roller 91 swung upwardly by a spring 97. A depending arm 98 is rigidly secured to the lever 92 and has a pin 99 rigidly secured thereto. This pin has an opening for receiving a rod 100 having a head or nut 101. The rod carries a compressible coil spring 102 engaging a washer 103 loose on the rod, and a collar 104 clamped to the rod. The rod 100 is pivotally connected with a hand lever 105, Figure 2, having latch means 107 for co-action with a quadrant 108. When the lever 105 is swung to the right, Figure 2, the bar 98 is swung upwardly and the lever 92 is swung in a vertical plane so that the roller 91 may be moved out of the path of travel of the points of the cam 90. When the lever 92 is in the lower position, Figure 10, the points of the cam 90 intermittently raise and lower the same, and the lever 92 will intermittently turn the gear 95. This gear is turning counterclockwise, Figure 2, and the intermittent turning movement of the gear 95, effects the step by step travel of the endless conveyor, so that the bars 36 feed the manure toward the beaters. It is thus seen that by manipulating the lever 105, the endless conveyor 35 may be rendered active or inactive.

Spools or drums 109 are rigidly mounted upon the shaft 64, near its ends, Figure 2, and have cables 110 wound thereon, Figures 2 and 3, which are passed about pulleys 111, carried by posts 66. The cables 110 are passed about upper pulleys 113, secured to posts 114, and the cables 110 are attached to the sides of the scoop 41. It is thus seen that by rotating the shaft 64, the cables 110 may be wound or unwound upon or from the drums 109, for raising or lowering the scoop 41.

A brake device is provided to hold the shaft 64 against rotation, as well as the scoop 41 when in raised position. This brake device, Figure 8, includes a brake drum 115, rigidly mounted upon the shaft 64. This brake drum co-acts with a brake band 116, one end of which has a head 117 provided with an opening 118, slidably receiving a rod 119 carrying a nut 120. The opposite end of the rod 119 has a head 121, pivoted upon a fixed support or bar 122. A compressible coil spring 123 surrounds the rod 119 and engages the head 117. A link 123' is pivoted to a head 124, secured to the opposite end of the brake band 116, and this link has a pivotal connection with a hand lever 125. The hand lever 125 is pivoted to the bar 122, at 126, and carries a dog 127 to engage teeth 128. When the lever 125 is thrown counter-clockwise, Figure 8, the brake band 116 will hold the brake drum against turning movement, and the dog 127 may then engage the teeth 128.

The operation of the machine is as follows:

When the box 29 is to be loaded with manure, the lever 76 is operated to render both bevel gear 68 and sprocket wheel 75 idle. The scoop 41 may now be in the lower position, Figure 3, and the tractor and the machine are backed whereby the scoop 41 is pushed into the pile of manure and is filled. The lever 76 is now operated to lock bevel gear 68 to the shaft 69 so that shaft 64 is rotated. The cables 110 are now wound upon the drums 109 and the scoop is elevated, Figure 3, so that the manure is fed into the box 29. This operation may be repeated any number of times, as desired. If desired, the brake device may be employed to hold the shaft 64 against turning movement by manipulating hand lever 125, the lever 76 being then actuated to unblock bevel gear 68 from the shaft 69. With the box suitably filled with the manure, the clutch 73 is shifted in the opposite direction for locking sprocket wheel 75 to the shaft 69. The rotation of the shaft 69 is derived from the power take-off unit of the tractor, which is controlled by the usual clutch on the tractor. As the tractor is now driven forwardly, the sprocket wheel 75 is rotated and the sprocket chain 84 is traveling in the direction of the arrow, Figure 2. The endless conveyor, including the bars 36, is fed intermittently to advance the manure to the open side 33 of the box 29, Figure 5. The manure is fed to the lower beater 50, and to the upper beater 53, if the level of the same is sufficiently high. The lower beater divides or breaks up the manure and throws it forwardly to and upon the paddles of the rotary distributor 56. The manure engaged by the upper beater 53 travels over the same and is divided and broken up by it, and discharged upon the lower beater, which again acts upon the manure and throws it outwardly. The manure from the beater or beaters is thrown to the paddles 57 and 58 of the rotary distributor. The longer paddles throw the manure for the greater distance, and the shorter paddles throw the same for a lesser distance. The long paddles do not distribute the manure to any considerable extent next to the rotary distributor, and the short paddles distribute the manure next to the rotary distributor. The two sets of paddles therefore co-act to produce a strip of the distributed manure which is substantially uniform in thickness throughout its width. As the machine is driven forwardly, a long strip of distributed manure is formed at the side of the machine, which strip extends longitudinally to the path of travel of the machine and is parallel therewith.

It is to be understood that the form of my invention as shown and described is to be taken as a preferred example of the same, and that various changes in the shape, size, and arrangement of parts may be resorted to, without departing from the spirit of my invention, or the scope of the subjoined claims.

Having thus described my invention, I claim:

1. A machine for spreading material, comprising a wheeled frame, a draft appliance secured to the forward end of the wheeled frame to connect it with a tractor so that the wheeled frame is moved longitudinally by the tractor, a box mounted upon the wheeled frame and having a discharge opening adjacent to one side of the wheeled frame, a conveyor to feed the material toward the discharge opening, means to operate the conveyor including a shaft and a gear wheel mounted upon the shaft, the shaft extending longitudinally of the frame, said gear wheel being arranged near the forward end of said frame, a lever pivotally mounted between its ends upon the shaft to swing vertically, a spring to move the lever in one direction, a pawl pivoted to the lever to engage the gear wheel, a second shaft mounted upon the frame and extending longitudinally thereof, a sprocket wheel mounted upon the second shaft and disposed forwardly of the frame, a cam rotating with the sprocket wheel to engage the lever, a rotary beating and spreading mechanism mounted upon the wheeled frame upon that side thereof near the discharge opening, said mechanism including sprocket wheels having their axes of rotation extending longitudinally of said frame and arranged near the forward end of the same, a longitudinal shaft mounted upon the frame at its forward end, a sprocket wheel mounted upon the longitudinal shaft, and a sprocket chain passing about the sprocket wheels of the longitudinal shaft and the beating and spreading mechanism and passing over and engaging the sprocket wheel which moves the cam.

2. A machine for spreading fertilizer material, comprising a wheeled frame, a box mounted upon the wheeled frame and having a discharge opening, a rotary beater mounted upon the wheeled frame near the discharge opening, a rotary distributor mounted upon the wheeled frame outwardly of and near the rotary beater, said rotary distributor including rotary elements including flat straight paddles having their faces parallel with the axis of rotation of the distributor, the paddles of some of the rotary elements being longer than the paddles of the other rotary elements, and drive means to rotate the beater and rotary distributor.

3. A machine for spreading fertilizer material, comprising a wheeled frame, a box mounted upon the wheeled frame and having a discharge opening, a rotary distributor mounted upon the wheeled frame outwardly of and near the discharge opening and having its axis of rotation extending longitudinally of said frame, said rotary distributor including rotary elements including flat straight paddles having their faces parallel with the axis of rotation of the distributor, the paddles of some of the rotary elements being longer than the paddles of the other rotary elements, means to feed the material from the opening of the box to the distributor, and drive means to rotate the distributor.

4. A machine for spreading material, comprising a wheeled frame, a draft appliance secured to the forward end of the wheeled frame to connect it with a tractor, a box mounted upon the wheeled frame and having a discharge opening adjacent to one side of the wheeled frame, a conveyor to feed the material toward the discharge opening, means to operate the conveyor including a shaft extending longitudinally of the wheeled frame and having its forward end extending forwardly beyond such frame, a gear wheel mounted upon the forward end of said shaft, a lever pivotally mounted between its ends upon said shaft adjacent to the gear wheel to swing vertically, a spring to move the lever in one direction, a pall pivoted to the lever to engage the gear wheel, a second shaft mounted upon the frame and extending longitudinally thereof and projecting forwardly beyond the frame, a sprocket wheel mounted upon the second shaft and disposed forwardly of the frame, a cam connected with the sprocket wheel to rotate therewith and arranged to engage the lever, spreading mechanism mounted upon the wheeled frame upon that side thereof near the discharge opening, said spreading mechanism including a sprocket wheel arranged forwardly of said frame and having its axis of rotation extending longitudinally of the frame, a longitudinal shaft mounted upon the frame at the forward end of the frame, a sprocket wheel mounted upon the longitudinal shaft, a sprocket chain passing about the sprocket wheels of the longitudinal shaft and the spreading mechanism and passing over and engaging the sprocket wheel connected with the cam, and yielding means connected with the lever to swing the same in one direction out of the path of travel of the cam.

MAURICE E. LEHMAN.

REFERENCES CITED

The following references are of record in the file of this patent:

UNITED STATES PATENTS

| Number | Name | Date |
|---|---|---|
| 648,519 | Oppenheim | May 1, 1900 |
| 1,101,358 | Thompson | June 23, 1914 |
| 1,248,032 | Synck | Nov. 27, 1917 |
| 1,285,058 | Dages et al. | Nov. 19, 1918 |
| 1,435,766 | Varland | Nov. 14, 1922 |
| 1,764,019 | Hardenbergh | June 17, 1930 |
| 1,979,945 | Kranick | Nov. 6, 1934 |
| 2,221,266 | Roach | Nov. 12, 1940 |
| 2,256,815 | Raney et al. | Sept. 23, 1941 |
| 2,430,020 | Johnson | Nov. 4, 1947 |

FOREIGN PATENTS

| Number | Country | Date |
|---|---|---|
| 705,474 | France | Mar. 9, 1931 |